United States Patent

Levsen et al.

[11] Patent Number: 5,638,664
[45] Date of Patent: Jun. 17, 1997

[54] VACUUM PACKAGING APPARATUS

[75] Inventors: Clark A. Levsen, Shawnee; David A. Rausch, Olathe, both of Kans.; Kevin Kelly, Kansas City, Mo.

[73] Assignee: Hantover, Inc., Kansas City, Mo.

[21] Appl. No.: 503,105

[22] Filed: Jul. 17, 1995

[51] Int. Cl.$^6$ ............................................. B65B 31/00
[52] U.S. Cl. ........................... 53/512; 53/374.8; 53/372.6
[58] Field of Search ........................... 53/510, 512, 300, 53/432, 312, 374.9, 374.8, 372.6

[56] References Cited

U.S. PATENT DOCUMENTS

| | | | |
|---|---|---|---|
| 3,047,991 | 8/1962 | Siegel et al. | 53/390 |
| 3,699,742 | 10/1972 | Giraudi | 53/512 |
| 4,860,523 | 8/1989 | Teteishi et al. | 53/512 |
| 4,903,459 | 2/1990 | Okinaka | 53/512 |
| 4,926,614 | 5/1990 | Costello et al. | 53/512 |
| 4,941,310 | 7/1990 | Kristen | 53/512 |
| 5,048,269 | 9/1991 | Deni | 53/512 |
| 5,215,445 | 6/1993 | Chen | 53/390 |
| 5,239,808 | 8/1993 | Wells et al. | 53/512 |

FOREIGN PATENT DOCUMENTS

| | | | |
|---|---|---|---|
| 3403534 | 8/1985 | Germany | 53/512 |
| 2164315 | 3/1986 | United Kingdom | 53/510 |
| 2211161 | 6/1989 | United Kingdom | 53/512 |

*Primary Examiner*—John Sipos
*Assistant Examiner*—Ed Tolan
*Attorney, Agent, or Firm*—Hovey, Williams, Timmons & Collins

[57] ABSTRACT

A vacuum packaging apparatus is provided for use in evacuating the air in an open-ended package and sealing the evacuated package. The apparatus includes structure defining a chamber sized only for receipt of the open end of the package with the remainder of the package disposed outside of the chamber, and a vacuum pump for evacuating the chamber and the package through the open end. The apparatus also includes a heating element for sealing the open end of the bag. The sealing element includes a seal bar supported for movement within the chamber between a retracted position removed from pressing engagement with the package and an extended position in pressing engagement with the package and a sealing wire supported on and extending across the seal bar. An electrical circuit supplies current to the sealing wire for heating the wire to a temperature sufficient to seal the package when the seal bar is in pressing engagement with the package.

11 Claims, 3 Drawing Sheets

VACUUM PACKAGING APPARATUS

BACKGROUND OF THE INVENTION

1. Field of the Invention

The present invention relates generally to packaging machines and, more particularly, to a vacuum packaging apparatus for use in evacuating the air in an open-ended package and sealing the evacuated package.

2. Discussion of the Prior Art

It is known to provide a vacuum packaging apparatus for use in evacuating the air in an open-ended package and sealing the evacuated package. A typical apparatus of this type presents a chamber sized only for receipt of the open end of the package with the remainder of the package disposed outside of the chamber, and a vacuum pump communicating with the chamber for evacuating the chamber and the package through the open end. Typically, the sealing mechanism includes a heating element disposed outside the vacuum chamber and extending along the front of the base beyond the ends of the vacuum chamber. The heating element is fixed to the cover so that when the cover is lowered onto the base, the heating element is pressed against a portion of the package external of the chamber. Upon evacuation of the package, current is delivered to the heating element, melting the package material to seal the package closed.

Several problems arise during use of a conventional vacuum packaging apparatus of this type. For example, during heavy use of the apparatus, e.g. in a commercial setting, where a number of packages are evacuated and sealed one after another, there is a tendency for the heating element to retain heat for a period of time well beyond the end of a packaging operation. As a result, when a subsequent package is placed in the apparatus for evacuation and sealing, the heating element presses against the package and prematurely seals it before the air in the package can be evacuated. Further, as heat is retained by the heating element, the temperature of the element increases with each sealing operation, and there is a tendency for the element to melt completely through the package material, resulting in a defective seal.

Another drawback to the use of a conventional vacuum packaging apparatus of the type described is that larger packages must be used with the apparatus than is necessary or desirable. For example, in addition to having to provide an empty area at the open end of each package for receipt in the vacuum chamber, an additional area must also be left empty in the region of the heating element so that the element can press the two opposing sides of the package together for sealing. Thus, a substantial region of each package must be left empty in order to accommodate use of the apparatus in evacuating and sealing the package.

OBJECTS AND SUMMARY OF THE INVENTION

It is an object of the present invention to provide a vacuum packaging apparatus capable of use in a commercial setting or the like where a number of packages are evacuated and sealed one after another, without any adverse effect on the operation of the apparatus.

It is another object of the invention to provide a vacuum packaging apparatus that is compact, presenting a small vacuum chamber within which a relatively movable sealing element is disposed for sealing evacuated packages. In this manner, it is possible to reduce the amount of open area that must be left in the open end of a package in order to permit the apparatus to be used to evacuate and seal the package.

In accordance with these and other objects evident from the following description of a preferred embodiment of the invention, a vacuum packaging apparatus is provided for use in evacuating the air in an open-ended package and sealing the evacuated package. The apparatus includes a means defining a chamber sized only for receipt of the open end of the package with the remainder of the package disposed outside of the chamber, an evacuating means for evacuating the chamber and the package through the open end, and a sealing means for sealing the open end of the bag. The sealing means includes a seal bar supported for movement within the chamber between a retracted position removed from pressing engagement with the package and an extended position in pressing engagement with the package, a sealing wire supported on and extending across the seal bar, and an electrical circuit for supplying current to the sealing wire for heating the wire to a temperature sufficient to seal the package when the seal bar is in pressing engagement with the package.

Preferably, the shifting means for shifting the seal bar between the retracted and extended positions includes a bladder on which the seal bar is supported, and a means for inflating the bladder to shift the seal bar to the extended position after the package has been evacuated and is ready to be sealed.

By providing a construction in accordance with the present invention, numerous advantages are realized. For example, by providing an apparatus having an evacuation chamber with a self-contained sealing means disposed therein, a compact apparatus results which is able to evacuate and seal relatively full open-ended packages without requiring a substantial amount of open area or bag material at the end of the package. Thus, bag material is conserved, reducing the cost of operation of the apparatus.

Another advantage obtained by employing the present invention resides in providing a sealing means that is raised into and out of pressing engagement with an evacuated package to effect sealing. By providing this construction, the sealing means is only allowed to seal a package when raised against the package and is not permitted to seal the package prematurely, regardless of the temperature of the sealing means. Thus, the apparatus can be used again and again, such as in a commercial setting, without adversely affecting evacuation of the package or the integrity of the seal.

BRIEF DESCRIPTION OF THE DRAWING FIGURES

The preferred embodiment of the invention is described in detail below with reference to the attached drawing figures, wherein.

DETAILED DESCRIPTION OF A PREFERRED EMBODIMENT

Figure 1:
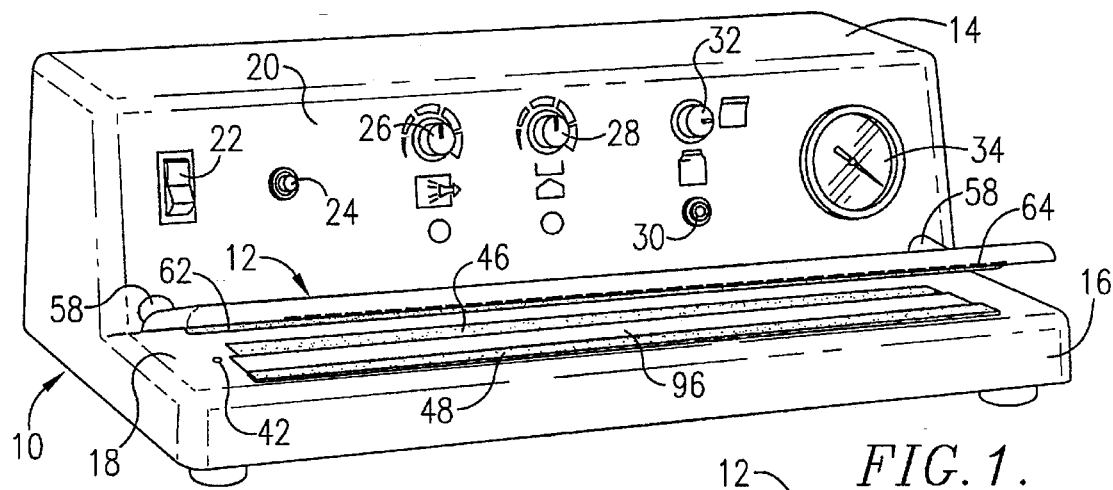
FIG. 1 is a perspective view of a vacuum packaging apparatus constructed in accordance with the preferred embodiment.

A vacuum packaging apparatus constructed in accordance with the preferred embodiment is shown in FIG. 1, and includes a base 10 forming a housing of the apparatus, and a cover 12 supported for pivotal movement relative to the base between a raised position as shown and a lowered position defining an evacuation chamber. As described below, the apparatus also includes an evacuation assembly, a sealing assembly and a control assembly.

The base 10 includes an upwardly extending rear portion 14 defining the housing and a forwardly extending front portion 16 having a generally horizontal upper surface 18. The rear portion presents a generally vertical control panel 20 on which several controls are provided. Specifically, the panel includes a power button 22 for providing electrical current, a stop button 24 for interrupting an evacuation operation and initiating a sealing operation, an evacuation control element 26 for adjusting the duration of an evacuation operation, and a sealing control element 28 for adjusting the duration of a sealing operation. In addition, a port 30 is provided on the panel for permitting connection of the apparatus to a jar or the like by a special attachment, as is a control element 32 for opening and closing communication between the port and the evacuation assembly. A negative pressure indicator 34 is also provided on the panel for permitting an operator to monitor an evacuation operation.

Figure 4:
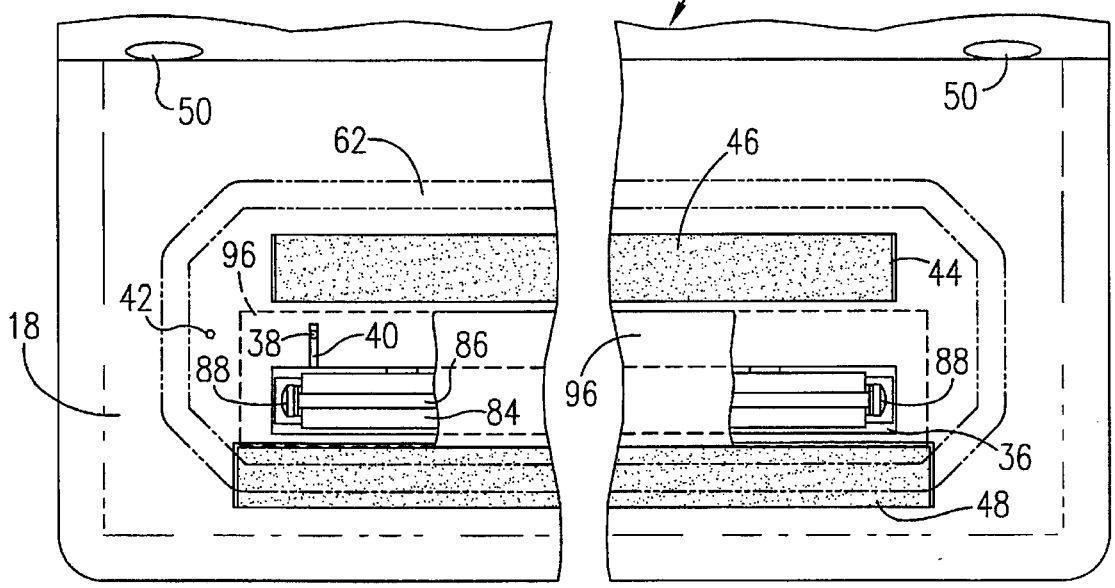
FIG. 4 is a fragmentary top plan view of the base, illustrating a shifting assembly supported on the base.

Turning to FIG. 4, the front portion 16 of the base includes a laterally extending well 36 depending from the upper surface at a position intermediate the front and rear edges thereof. The well is positioned so that it is within the evacuation chamber when the cover is pivoted to the sealed position relative to the base, and is of a length adapted to extend beyond the ends of the opening in a package to be evacuated and sealed when the package is positioned in the chamber. An evacuation port 38 communicates with the upper surface of the base and with the well via a small horizontally extending channel 40. When a vacuum pressure is drawn by the evacuation assembly, air is drawn from the well via the channel 40 and the port 38. An additional port 42 is provided in the upper surface of the base at a position spaced from the well, and this port draws air from the remainder of the chamber during operation of the evacuation assembly.

A laterally extending trap 44 depends from the upper surface of the base at a position spaced rearward of the well and is of a length substantially equal to the length of the well. The trap is also positioned so that it is within the chamber when the cover is pivoted to the sealed position, and serves to collect any liquids that are drawn from the package during evacuation. An elongated, open-celled sponge 46 or the like having dimensions corresponding to those of the trap is provided in the trap for collecting the liquids. Once the sponge becomes filled with liquids, it is only necessary to pull the sponge from the trap and clean it in order to permit further use of the apparatus.

An additional laterally extending channel depends from the upper surface of the base at a position spaced forward of the well 36. The channel is relatively shallow, being adapted to receive a backing strip 48 of close-celled foam or the like that extends along the front edge of the evacuation chamber. The strip preferably extends slightly beyond the ends of the well 36.

Figure 9:
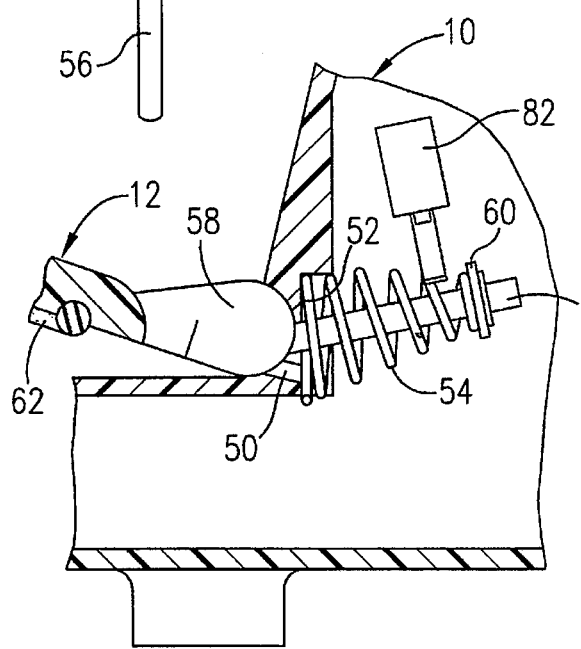
FIG. 9 is a fragmentary sectional view of the apparatus, illustrating the mounting arrangement of the cover on the base.

A pair of laterally spaced holes 50 are formed in the base adjacent the junction between the upper surface 18 of the front portion and the control panel 20. As shown in FIG. 9, the holes 50 each include a socket adapted to receive the cover and guide pivotal movement of the cover relative to the base in a manner described more fully below. In addition, each hole includes structure defining a spring seat 52 for supporting a conical compression spring 54 that biases the cover toward the raised position.

Figure 5:
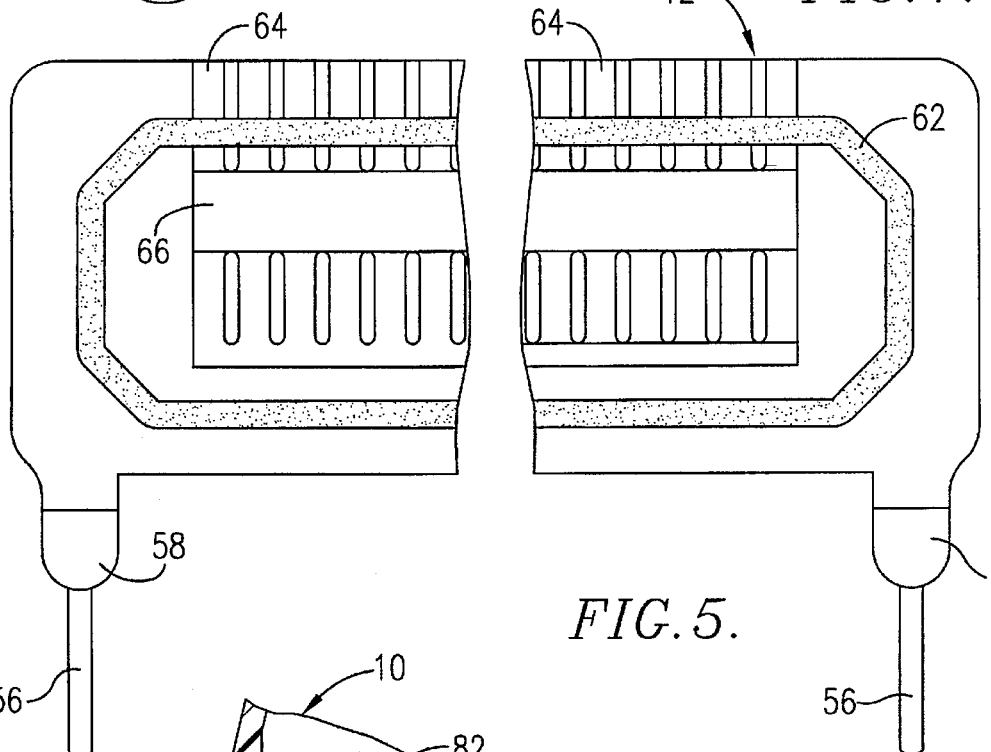
FIG. 5 is a fragmentary bottom plan view of the cover.

The cover 12 is illustrated in FIG. 5, and includes an elongated flat panel formed of plastic or other suitable rigid material, and a pair of arms 56 extending rearward from the corners of the cover. A spherical shoulder 58 is defined by the cover adjacent each arm and these shoulders seat in the sockets defined by the holes 50, as shown in FIG. 9, to define a pivot axis about which the cover is movable. Each arm extends through one of the conical compression springs and includes a seat 60 fixed adjacent the distal end thereof for retaining the spring on the arm against the seat 52 of the base.

Figure 7:
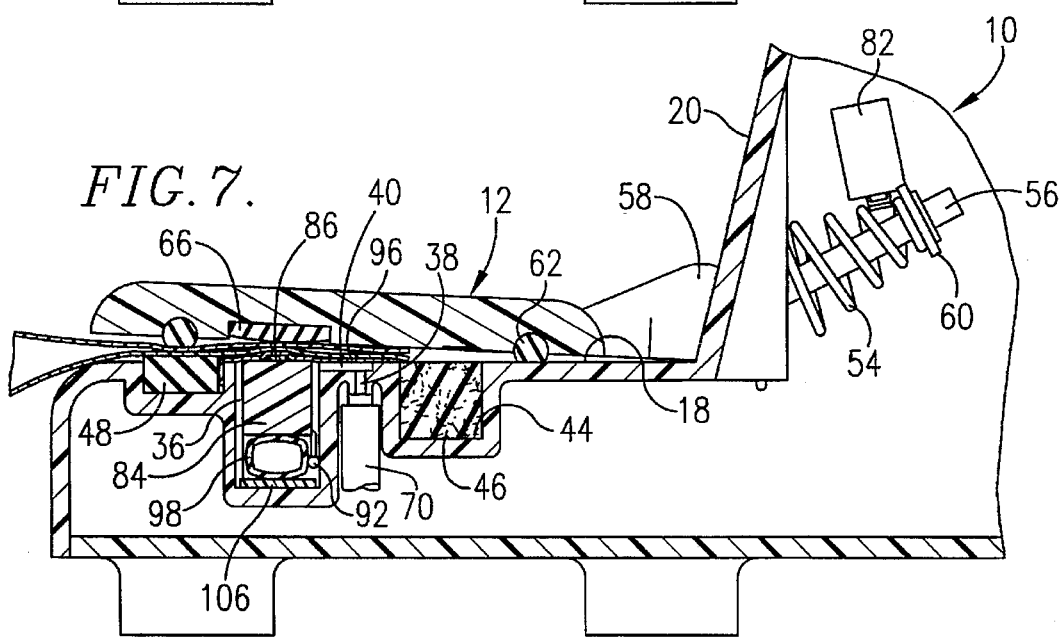
FIG. 7 is a fragmentary side sectional view of the apparatus illustrating the cover in a closed, sealed position and a package positioned for evacuation and sealing.

Returning to FIG. 5, the lower surface of the cover panel defines the upper surface of the evacuation chamber when the cover is in the sealed position. The lower surface of the cover includes a groove forming a closed polygonal shape defining the shape of the evacuation chamber. The groove is adapted to receive an elastomeric seal strip 62 that protrudes from the surface and defines the side wall of the evacuation chamber. When the cover is in the sealed position, the seal strip circumscribes the well and trap formed in the base, and the section of the strip extending along the front of the base engages the backing strip of close-celled foam, as shown in FIG. 7. A plurality of channels 64 are formed in the lower surface of the cover, as illustrated in FIG. 5, and extend rearward from the front edge of the cover. These channels are interrupted by the portion of the seal strip 62 defining the front wall of the chamber and by a laterally extending depression that overlies the well when the cover is pivoted to the sealed position. The depression is adapted to receive a silicone backing strip 66.

Figure 10:
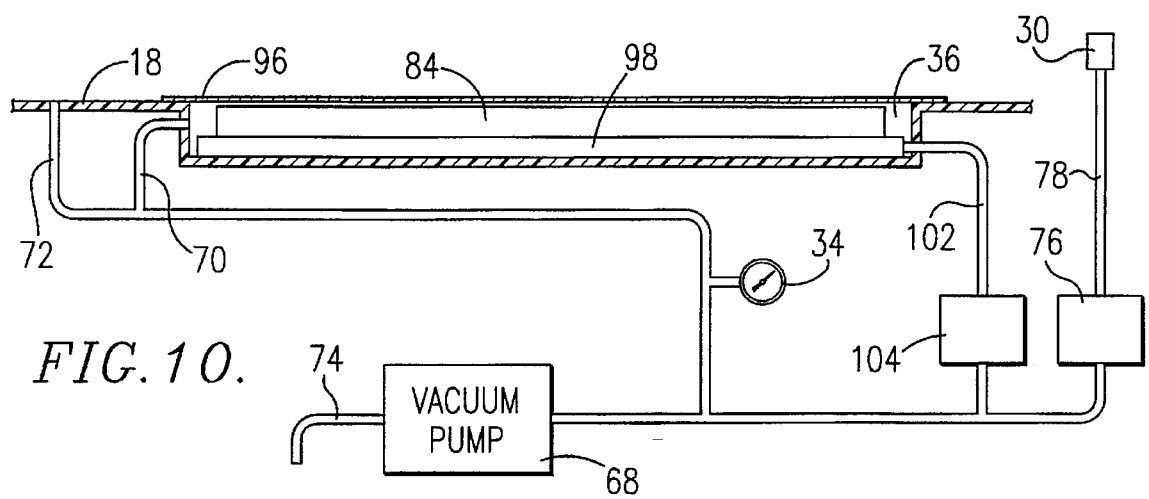
FIG. 10 is a schematic pneumatic diagram of the apparatus.

The evacuation assembly is illustrated schematically in FIG. 10, and includes a vacuum pump 68 supported on the base and having an inlet connected to the ports 38, 42 by flexible lines 70, 72 and an outlet 74 exposed to atmosphere. A line 78 provides communication between the jar port and the pump, and a valve 76 is positioned in the line 78 for connecting and disconnecting the port from the vacuum pump. The valve 76 is controlled by the element 32. The gauge 34 is connected to the line for indicating the negative pressure in the line during an evacuation operation. As shown in FIG. 9, a switch 82 is provided on the base for controlling the supply of power to the vacuum pump, and the switch is closed upon movement of the cover 12 to the lowered, sealed position, energizing the vacuum pump to initiate an evacuation operation. The evacuation control element 26 is preferably a timer that maintains current flow to the vacuum pump for a fixed period of time before interrupting the supply and automatically terminating an evacuation operation. Manipulation of the element 26 changes the duration of the operation.

Figure 2:
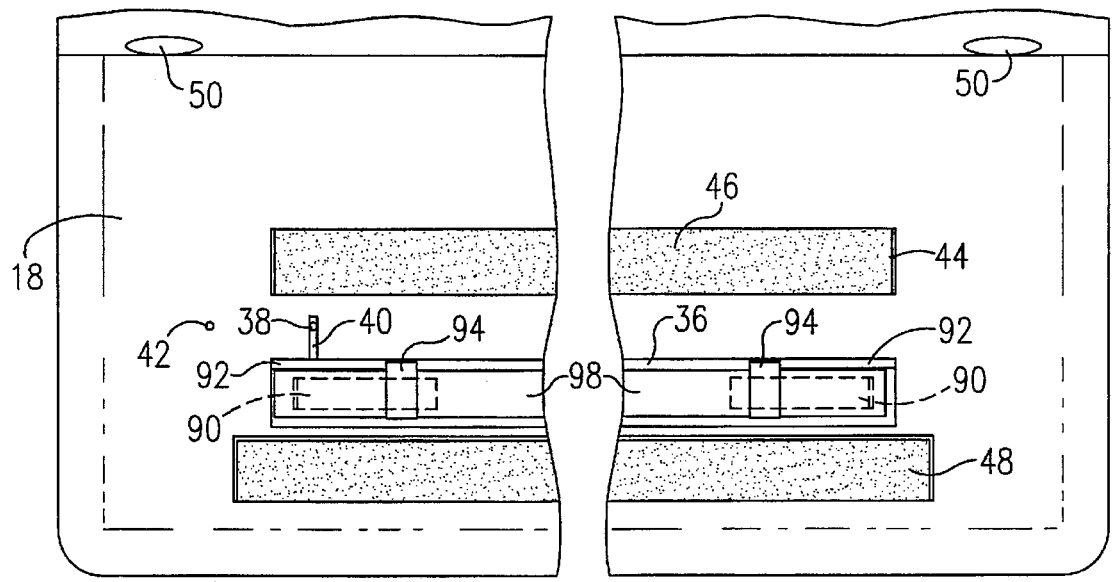
FIG. 2 is a fragmentary top plan view of the apparatus, illustrating a base forming a part thereof.
Figure 3:
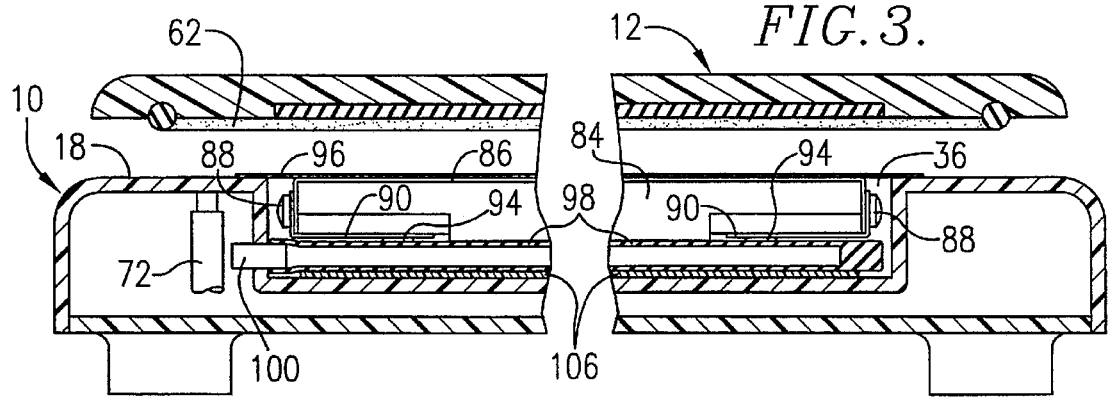
FIG. 3 is a fragmentary front sectional view of the apparatus, illustrating the base and a cover forming a part of the apparatus.
Figure 6:
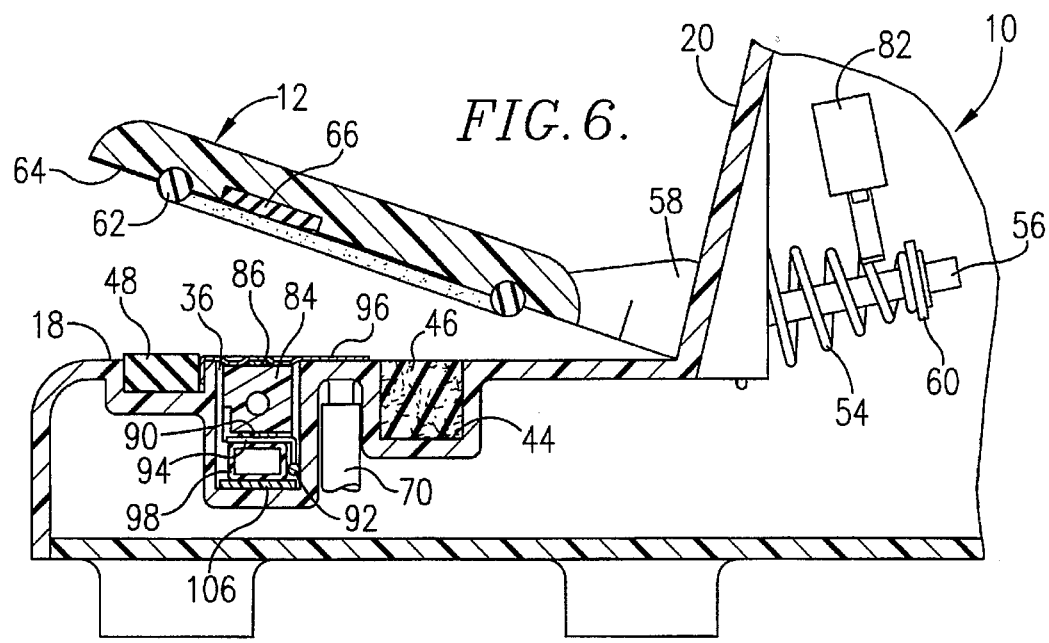
FIG. 6 is a fragmentary side sectional view of the apparatus illustrating the cover in an open position.

As illustrated in FIG. 3, the sealing assembly is provided for sealing the open end of an evacuated package, and broadly includes a seal bar 84 supported for movement within the well between a lowered, retracted position withdrawn from the chamber, as shown in FIG. 6, and a raised, extended position protruding slightly into the chamber against the silicone backing strip 66 of the cover, as shown in FIG. 7. In addition, the assembly includes a sealing wire 86 supported on and extending across the seal bar, as shown in FIG. 2. An electrical circuit is provided for supplying current to the sealing wire for heating the wire to a temperature sufficient to seal a package when the seal bar is in the extended position.

Figure 8:
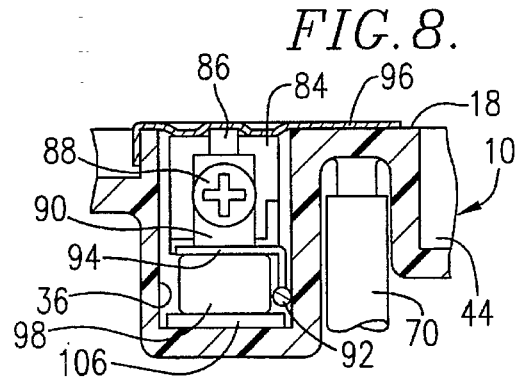
FIG. 8 is a fragmentary sectional view of the base, illustrating a sealing assembly and the lifting assembly of the apparatus.

The seal bar 84 is formed of an electrically insulative material such as wood, and presents a flat upper surface across which the sealing wire extends. As shown in FIG. 8, the sealing wire 86 preferably is formed of a flat strip of an electrically conductive material and wraps around the ends of the seal bar. A fastener 88 is used to secure each end of the sealing wire to the seal bar, and these fasteners also connect the sealing wire to conductive tabs 90 formed of brass or other conductive material. The tabs 90 wrap around the ends of the seal bar to the bottom side thereof and provide electrical contact between the sealing wire and the electrical circuit. Preferably, the circuit includes the power supply, a switch for closing the circuit, conductors 92 extending into the well at the ends thereof, and a pair of L-shaped electrical leads 94 that connect the wires with the conductive tabs. The sealing control element preferably includes a timer for controlling the duration of energization of the sealing wire during each sealing operation so that the proper amount of heat is generated to seal a package. Manipulation of the element 28 adjusts the duration of the heating step.

A strip of protective tape 96 formed of TEFLON® or the like is adhered to the upper surface of the base and covers the well. This tape protects the sealing wire from exposure within the chamber while permitting movement of the seal bar between the retracted and extended positions.

The sealing assembly also includes a shifting means for shifting the seal bar between the retracted and extending positions. The shifting means is illustrated in FIG. 3 and includes a tubular bladder 98 having a square cross-sectional shape and a length substantially equal to the length of the seal bar. The bladder is formed of a resilient material which permits the bladder to be inflated when exposed to an internal pressure exceeding the external pressure around the bladder. One axial end of the bladder is closed and the other is open, and a conduit 100 extends through the wall of the well and is connected to the open end of the bladder. The conduit is connected to the vacuum pump by a line 102, shown in FIG. 10, within which a valve 104 is disposed. The valve 104 is normally open so that when the vacuum pump is operated air is drawn from both the chamber and the bladder. As a result, no pressure differential results between the interior and exterior of the bladder, and it retains its unexpanded shape.

When the valve 104 is operated to close off the bladder from communication with the vacuum pump, further operation of the vacuum pump creates a pressure differential that causes the bladder to expand within the well, lifting the seal bar 84 and sealing wire 86 to the extended position shown in FIG. 7. A spacer 106 can be provided beneath the bladder 98 for establishing the desired positional relationship of the seal bar relative to the chamber. The electrical leads 94 rest on top of the bladder in contact with the conductive tabs 90 on the underside of the seal bar so that current is supplied to the sealing element regardless of the expanded condition of the bladder.

The apparatus is adapted for use in evacuating the air in an open-ended package and sealing the evacuated package. Preferably, the package is formed as a bag having an open end within which food products or the like can be placed. The material used to form the bag is conventional, and possesses the characteristic of being heat sealable such that when the two opposed bag walls are held against one another and heat with a predetermined temperature applied, the material melts to form a bond that seals the package closed. In addition, the material preferably includes an embossed relief pattern presenting a plurality of channels through which air can be drawn from the package even when the two opposed bag walls are pressed against one another. The depth of these channels corresponds to the depth of the channels in the cover of the apparatus so that even when the cover is sealed against the base, at least some of the channels in the bag remain open for permitting evacuation of the package.

With reference to FIG. 6, in use, the package is filled to a level within an inch or two of the open end of the bag and the open end is laid onto the base of the apparatus with the package forward of the base and with the open end extending rearward of the sealing assembly. Thereafter, the cover 12 is manually pivoted to the lowered position so that the elastomeric seal strip 62 presses against the upper surface 18 of the base and the package, sealing the chamber around the open end of the package. Movement of the cover actuates the switch 82 causing electricity to be supplied to the vacuum pump. Thereafter, the pump is energized for a predetermined time during which air is evacuated from the package and the chamber, and sealing of the package is carried out.

During the initial evacuation of the chamber and package, the bladder 98 is in communication with the vacuum pump so that it does not expand. As a result, the seal bar remains in the retracted position out of contact with the package. At a predetermined time after initiation of the vacuum pump, the valve 104 in the line to the bladder is closed such that a negative pressure differential is created across the bladder wall during continued operation of the pump. This negative pressure differential causes inflation of the bladder, raising the seal bar 84 to the extended position in which the seal bar presses the package against the silicone backing strip 66 of the cover, as shown in FIG. 7. At the same time, electricity is supplied to the sealing strip, heating the strip to a temperature sufficient to fuse the package material and seal the package. The electricity is interrupted after 1–2 seconds while the bar remains in the extended position to form a complete seal across the open end of the package.

Once the predetermined evacuation time has lapsed, the pump is interrupted and the chamber is exposed to ambient pressure. The compression springs 54 then return the cover to the raised position shown in FIG. 6 so that the evacuated and sealed package can be removed from the apparatus. The timing of the evacuation and sealing operations is established by the control elements and can be adjusted by manipulating the elements. The stop button 24 on the control panel is provided for immediately interrupting evacuation and initiating sealing upon depression of the button and overrides the normal timing control established by the elements. The power button 22 controls the supply of power to the apparatus and normally remains on during and between packaging operations.

If it is desired to evacuate a jar or the like, a special lid can be threaded onto the open end of the jar and connected by a suitable hose to the jar port. By actuating the control element 32, shown in FIG. 1, the port communicates with the vacuum pump so that when the cover is lowered onto the base, the vacuum pump is energized and a vacuum is drawn from both the chamber and the port 30. In this manner, air is evacuated from the jar. As with the operation discussed above, timing of the evacuation operation is fixed, and the duration is controlled by the element 26. At the end of this fixed period of time, the pump is interrupted and the cover is biased back to the raised position.

Although the apparatus is not intended for use in sealing packages containing liquids, it is possible that other food products will be packaged that contain some liquid that will be drawn from the package during evacuation. Such liquid flowing from the package drains into the underlying trap 44, shown in FIG. 7, and is absorbed by the sponge 46. This protects the vacuum pump from exposure to liquids and enables easy cleaning of the trap simply by removing the sponge and washing it.

Although the present invention has been described with reference to the preferred embodiment illustrated in the attached drawing figures, it is noted that substitutions may be made and equivalents employed herein without departing from the scope of the invention as recited in the claims.

What is claimed is:

1. A vacuum packaging apparatus for use in evacuating the air in an open-ended package and sealing the evacuated package, the apparatus comprising:

a means defining a chamber sized only for receipt of the open end of the package with the remainder of the package disposed outside of the chamber;

an evacuating means for evacuating the chamber and the package through the open end;

a sealing means for sealing the open end of the bag, the sealing means including a seal bar supported for movement within the chamber between a retracted position removed from pressing engagement with the package and an extended position in pressing engagement with the package, a sealing wire supported on and extending across the seal bar, and an electrical circuit for supplying current to the sealing wire for heating the wire to a temperature sufficient to seal the package when the seal bar is in pressing engagement with the package; and a shifting means for shifting the seal bar between the retracted and extended positions, the shifting means including a bladder on which the seal bar is supported, and a means for inflating the bladder to shift the seal bar to the extended position, the means for inflating the bladder including a line connecting the bladder with the evacuating means and a normally open valve movable between a closed position in which the bladder is closed off from the evacuating means and an open position in which the bladder is connected to the evacuating means, the bladder being inflated in the closed position of the valve upon evacuation of the chamber.

2. A vacuum packaging apparatus as recited in claim 1, wherein the means defining the chamber includes a base forming a bottom surface of the chamber and a cover forming a top surface of the chamber, the cover being movable relative to the base between an open position in which the open end of the package can be positioned in the chamber and a sealed position.

3. A vacuum packaging apparatus as recited in claim 2, wherein the evacuation means communicates with the chamber through a port in the base.

4. A vacuum packaging apparatus as recited in claim 2, wherein the base includes a well within which the seal bar and shifting means are received.

5. A vacuum packaging apparatus as recited in claim 2, wherein the base includes a fluid trap for receiving fluid that drains into the chamber from the package during evacuation and sealing of the bag, the apparatus further comprising a sponge sized for receipt in the trap for absorbing fluid, the sponge being removable from the trap to permit cleaning.

6. A vacuum packaging apparatus as recited in claim 2, further comprising a strip of sealing material secured to the cover and extending downward from the top surface toward the base, the strip forming a loop that circumscribes the chamber to define front, side and rear walls of the chamber in the sealed position of the cover.

7. A vacuum packaging apparatus as recited in claim 6, wherein the base includes a strip of resilient backing material extending beneath the strip of sealing material along the front wall of the chamber to maintain communication between the chamber and the package when the cover is in the sealed position.

8. A vacuum packaging apparatus as recited in claim 7, wherein the cover includes at least one channel in the top surface of the chamber extending in a direction perpendicular to and spanning the front wall defined by the strip of sealing material.

9. A vacuum packaging apparatus as recited in claim 4, wherein the cover includes a strip of resilient backing material extending above and in alignment with the seal bar in the sealed position of the cover to maintain pressure across the open end of the package when the seal bar is in the extended position.

10. A vacuum packaging apparatus as recited in claim 1, wherein the evacuating means includes a vacuum pump and a switch for actuating the vacuum pump, the switch being interposed between the base and the cover so that the switch is closed when the cover is moved to the sealed position, actuating the vacuum pump.

11. A vacuum packaging apparatus as recited in claim 1, further comprising a port that is positioned external of the chamber and connected to the evacuating means, and a valve interposed between the port and the evacuating means and movable between a closed position in which the port is closed off from the evacuating means and an open position in which the port is connected to the evacuating means.

* * * * *